United States Patent
King

(10) Patent No.: US 9,460,221 B2
(45) Date of Patent: Oct. 4, 2016

(54) HISTORY OF READING POSITIONS IN EBOOKS

(71) Applicant: Google Inc., Mountain View, CA (US)

(72) Inventor: Virgil Scott King, Arlington, MA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/136,080

(22) Filed: Dec. 20, 2013

(65) Prior Publication Data

US 2015/0178403 A1    Jun. 25, 2015

(51) Int. Cl.
G06F 7/00      (2006.01)
G06F 17/30     (2006.01)
G06Q 30/02     (2012.01)

(52) U.S. Cl.
CPC ......... *G06F 17/30884* (2013.01); *G06Q 30/02* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 6,820,111 B1 * | 11/2004 | Rubin | G06F 17/30884 707/E17.114 |
| 8,522,141 B2 | 8/2013 | Yoon et al. | |
| 2011/0191701 A1 | 8/2011 | Kim et al. | |
| 2012/0005617 A1 * | 1/2012 | Lee | G06F 17/30038 715/776 |
| 2012/0079372 A1 | 3/2012 | Kandekar et al. | |
| 2012/0150655 A1 * | 6/2012 | Seth | G06Q 30/0269 705/14.66 |
| 2012/0221938 A1 | 8/2012 | Patterson et al. | |
| 2012/0221968 A1 | 8/2012 | Patterson et al. | |
| 2012/0311438 A1 * | 12/2012 | Cranfill | G06F 17/30011 715/256 |
| 2013/0268880 A1 | 10/2013 | Kasravi et al. | |
| 2014/0040715 A1 * | 2/2014 | Younge | G06F 17/24 715/203 |
| 2015/0161108 A1 * | 6/2015 | Back | G06F 17/2881 704/9 |

FOREIGN PATENT DOCUMENTS

WO    WO 03/094040    11/2003

* cited by examiner

*Primary Examiner* — Augustine K Obisesan
*Assistant Examiner* — Lin Lin Htay
(74) *Attorney, Agent, or Firm* — Fenwick & West LLP

(57) ABSTRACT

A user device for presenting eBooks generates a navigation history that allows a user to easily navigate to previously accessed positions within the eBook. The navigation history can be stored on an eBook server and shared with other user devices used by the same user. The navigation history may be generated by receiving actions regarding navigation within the eBook, an action navigating from a current reading position within the eBook to a corresponding navigation position in the eBook; filtering the received actions and the corresponding navigation positions to produce a filtered list of navigation positions; storing the filtered list of navigation positions in a navigation history; presenting the navigation history to the user; receiving a request from the user to navigate to a selected one of the navigation positions from the navigation history; and presenting a portion of the eBook at the selected navigation position.

14 Claims, 4 Drawing Sheets

HISTORY OF READING POSITIONS IN EBOOKS

TECHNICAL FIELD

This disclosure generally relates to eBooks, and in particular to navigation within eBooks.

BACKGROUND

While reading electronic books (eBooks), readers often navigate to positions within an eBook that are distant from their current reading position. In existing eBook applications, it is difficult for readers to navigate between these distant positions and their current reading position. Although many eBooks contain a table of contents, further navigation on the part of the reader is often required to navigate to the desired position and back to their current reading position. If the reader has sufficient foresight, some eBook applications allow the reader to create a bookmark before they navigate to another position within the book. However, creating bookmarks does not handle the frequently-occurring situation where a reader navigates to a distant position within the eBook before creating a bookmark.

SUMMARY OF THE INVENTION

A user device for presenting eBooks generates a navigation history that allows a user to easily navigate to previously accessed positions within the eBook. The navigation history can be stored on an eBook server and shared with other user devices used by the same user. The navigation history may be generated by receiving actions regarding navigation within the eBook, an action navigating from a current reading position within the eBook to a corresponding navigation position in the eBook; filtering the received actions and the corresponding navigation positions to produce a filtered list of navigation positions; storing the filtered list of navigation positions in a navigation history; presenting the navigation history to the user; receiving a request from the user to navigate to a selected one of the navigation positions from the navigation history; and presenting a portion of the eBook at the selected navigation position.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
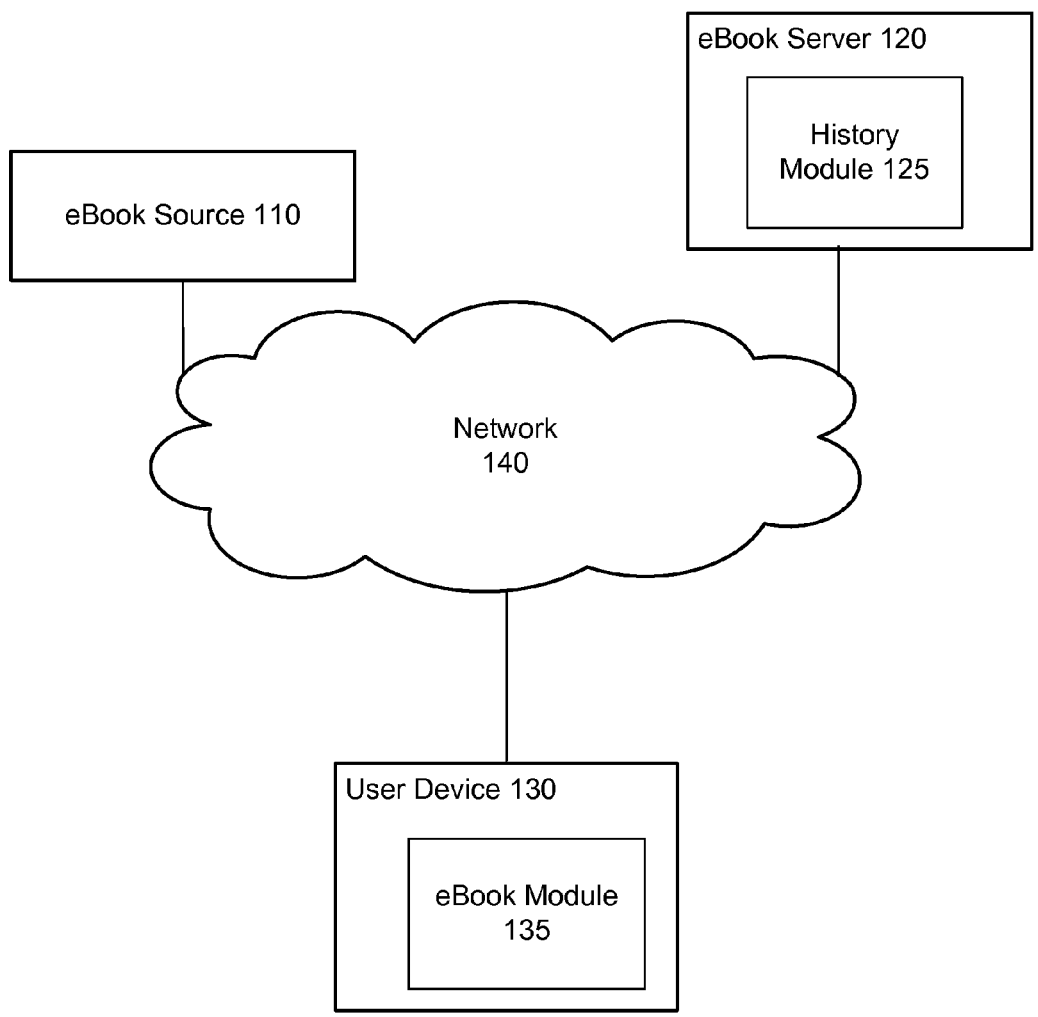
FIG. 1 is a high-level block diagram of a computing environment according to one embodiment of the invention.

FIG. 1 is a high-level block diagram that illustrates a computing environment according to one embodiment of the invention. The computing environment 100 includes a eBook source 110, an eBook server 120, and a user device 130 coupled through a network 140. For clarity, FIG. 1 illustrates only a single instance of each component of the computing environment 100, but those of skill in the art will recognize that multiple instances of each of these may be present.

The eBook source 110 is a computer system configured to store and transmit data representing electronic books (e.g., books in a machine readable format). The exact format used may vary by implementation. Examples of eBook formats include Electronic Publication (EPUB), Hypertext Markup Language (HTML), and PORTABLE DOCUMENT FORMAT (PDF).

The user device 130 is a computing device that presents eBooks to a user. The user device 130 can be a dedicated eBook reader, or another general or specific-purpose computing device such as a smart phone, tablet, notebook, or desktop computer. The user device 130 includes an eBook module 135 that presents the eBook and provides an interface for user interaction with the eBook. The eBook module 135 can be a standalone application or integrated into operating systems, web browsers or other software executing on the user device 130.

Additionally, the eBook module 135 generates a history of the user's navigations to positions within an eBook. The navigation history includes a list of navigation positions within the eBook that have been accessed by the user through the interface. The navigation history is generated automatically responsive to receipt of navigation actions at the interface to navigate to navigation positions within the eBook. In conjunction with the interface, the eBook module 135 presents the navigation history to the user, so that the user may quickly navigate to previously accessed navigation positions. In one embodiment, navigation histories are generated separately for each user and eBook, and may also be created separately for each reading session. The eBook module 135 allows for quick and convenient navigation throughout the eBook based on the user's own navigation history.

The eBook module 135 is also configured to send and retrieve a user's navigation history for an eBook from the eBook server 120. In one embodiment, the user device 130 retrieves both the eBook and the user's navigation history for an eBook from the eBook server 120. In another embodiment, eBook is retrieved from the eBook source 110, and the navigation history is retrieved from the eBook server 120.

The eBook Server 120 receives and provides previously generated navigation histories to user devices 130. The eBook server 120 includes a history module 125 that stores navigation histories in a database (not shown) indexed by user and eBook. The history module 125 further provides the navigation history to a requesting user device 130. By storing navigation histories on a server 120 separate from a user device 130, the eBook server 120 allows a user to access their navigation history for an eBook across multiple user devices 130. For example, if the user owns a tablet computer and a smart phone, they can conduct a first reading session of an eBook on the tablet, and then conduct a second reading session of the same eBook on the smart phone, and still be able to access and make use of a single navigation history for the eBook that encompasses both reading sessions.

In situations in which the systems discussed here collect personal information about users, or may make use of personal information, such as the navigation history, the user may be provided with an opportunity to control whether programs or features collect user information (e.g., information about a user's navigation history within an eBook), or to control whether and/or how to receive content from the eBook server 120 (e.g., a previously generated navigation history). In addition, certain data may be treated in one or more ways before it is stored or used, so that personally identifiable information is removed. For example, a user's identity may be treated so that no personally identifiable information can be determined for the user, or a user's geographic position may be generalized where position information is obtained (such as to a city, ZIP code, or state level), so that a particular position of a user cannot be determined. Thus, the user may have control over how information about the user is collected and distributed by the eBook server 120.

The network 140 is typically the Internet, but can be any network, including but not limited to any combination of a LAN, a MAN, a WAN, a mobile, a wired or wireless network, a private network, or a virtual private network. The eBook server 120 and user device 130 are connected to the network 140 through network interfaces.

Computer Architecture

Figure 2:
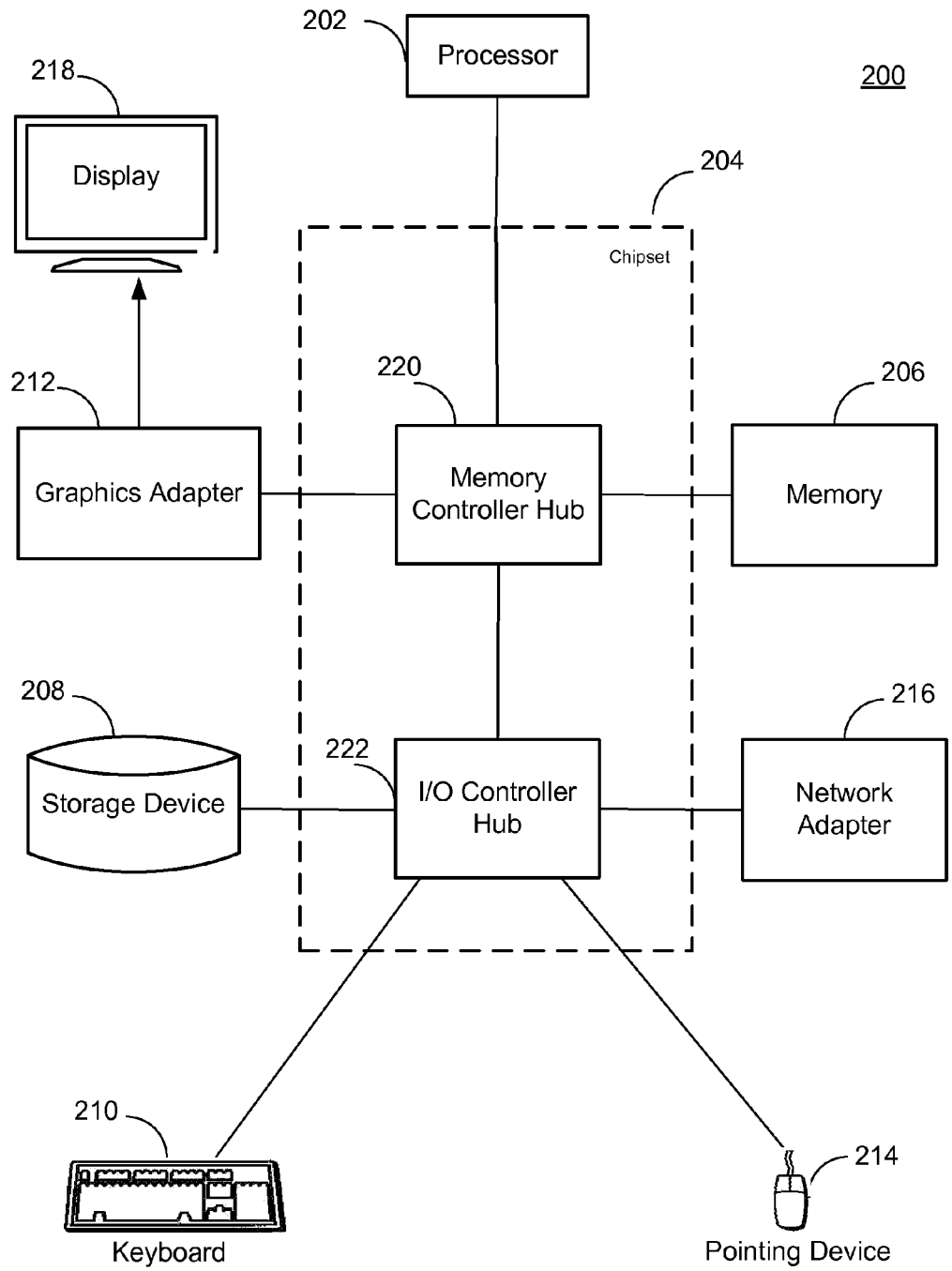
FIG. 2 is a high-level block diagram illustrating an example of a computer for use in the computing environment shown in FIG. 1 according to one embodiment of the invention.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a present 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 presents images and other information on the present 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the eBook server 120 might include multiple blade servers working together to provide the functionality described herein, whereas the user device 130 might include a tablet computer or smart phone configured to provide the functionality described herein. The computers 200 can lack some of the components described above, such as keyboards 210, graphics adapters 212, and presents 218.

Example Architectural Overview of the eBook Module

Figure 3:
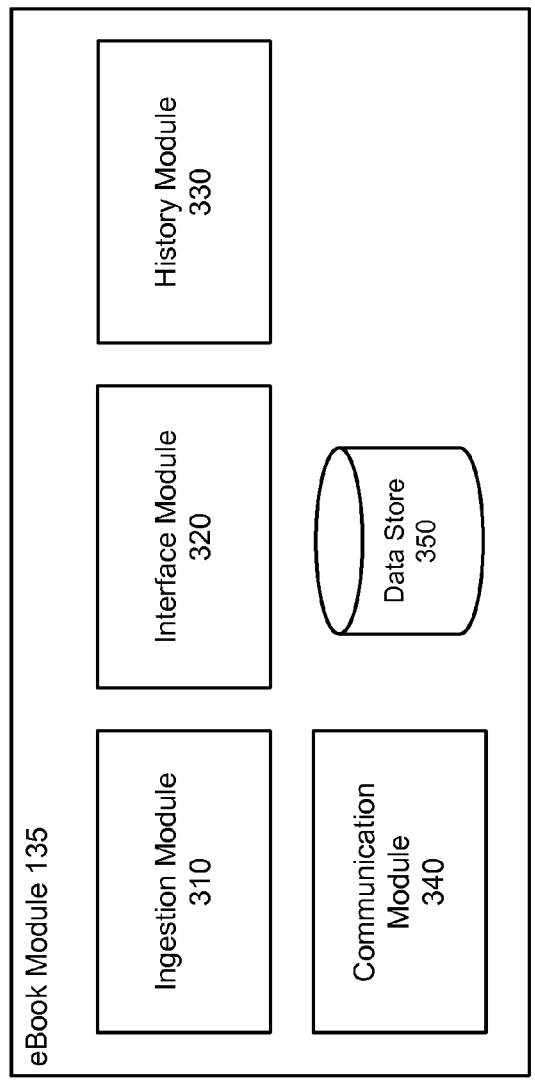
FIG. 3 is a high-level block diagram illustrating an eBook module within a user device shown in FIG. 1 according to one embodiment of the invention.

FIG. 3 is a high-level block diagram illustrating an eBook module 135 within a user device. Some embodiments of the module 135 have different and/or other modules than those described herein. Similarly, the functions can be distributed among the modules in accordance with other embodiments in a different manner than is described herein. As shown, the module 135 includes an ingestion module 310, an interface module 320, a history module 330, a communication module 340, and a data store 350.

The ingestion module 310 retrieves an eBook from the eBook source 110 or the eBook server 120, and a user's navigation history for the eBook from the eBook server 120. The eBook and navigation history are stored in the data store 350. The content of an eBook may include, for example, raw text, formatting for raw text, images, video, audio, and interactive content. An example of interactive content are embedded links that allow a user to quickly navigate between distantly located navigation positions within the eBook. For example, an embedded link may allow for jumping between body text and a footnote, or from one page of the book to another distantly located page within the eBook.

The content of an eBook is usually organized in some manner. This may be as simple as a page numbering scheme where each page of eBook content includes some amount of content. Other organizational schemes for organizing portions of the eBook are also possible, for example by word location, section, by chapter, etc. Each portion of an eBook (e.g., each item of content within the eBook) occurs at a particular navigation position within the eBook.

The interface module 320 both presents the content of eBook on the user device 130, and also provides an interface that allows a user to navigate to different navigation positions within the eBook. The interface provides a number of different input options to a user, and responds responsive to receiving inputs (or actions) from the user. Examples of actions include adjusting the presentation of the eBook (e.g., zoom state, font, etc.) A number of input options/actions correspond to navigation within the eBook. Navigation actions cause the interface to navigate to a different navigation position in the eBook and present the corresponding portion of the eBook. Examples of navigation actions include scrolling, presenting the next page, presenting the previous page, and interactions with embedded links that jump to a particular navigation position within the eBook. Some navigation actions involve multiple inputs from the user. One example includes presenting a table of contents and then navigating to the navigation position a selected one of the entries in the table of contents. Another example includes receiving a search query, presenting a set of search results matching the search query, and navigating to a navigation position of a selected one of the search results.

The history module 330 generates a navigation history that provides another mechanism for navigating within the eBook. The navigation history generated by the history module 330 represents a list of navigation positions within the eBook that the user has previously navigated to using the interface. The history module 330 provides the navigation history to the interface module 330 for inclusion in the interface. For example, the interface module 320 may present the navigation history, receive a selection action from a user regarding one of the navigation positions in the navigation history, and then subsequently navigate to and present the portion of the eBook corresponding to the selected navigation position.

The history module 330 generates the navigation history by logging navigation positions from actions received by the interface module 330 through the interface. The navigation history is stored as a list in data store 350. Each entry in the navigation history describes the navigation position that was navigated to in response to a received action. The navigation history may store the navigation position, the navigation action, or both. Further, the history module 330 may also store additional information. This information includes the time and/or date the navigation action took place, and the number of times a particular navigation position has been accessed. Other statistics may also be derived and stored based on this information, such as a frequency of access of a particular navigation position. This additional information is stored in the data store 350 as part of the navigation history.

The history module 330 filters received navigation actions to determine a filtered list of received navigation actions are stored as part of the navigation history in the data store 350. How navigation actions are filtered may vary by implementation. In one embodiment, the history module 330 applies filtering criteria to the navigation actions so that only particular types of navigation actions contribute navigation positions to the navigation history. The filtering criteria may include filtering out (i.e., remove and not store) particular types of navigation actions, and filtering out navigation actions based on the magnitude of the position change within the eBook from the user's current reading position. The history module 330 may use different and/or additional filtering criteria in other embodiments.

For filtering criteria based on the type of navigation action, the filtering criteria may remove previous page, next page, and scroll actions so that they are not stored in the navigation history because the user often performs such actions while reading the eBook at a normal pace. The filtering criteria may pass (i.e., store) some types of navigation actions because the user does not often perform such actions while reading the eBook at a normal pace, and/or because such actions access content related to the current reading position that the user may wish to return to in the future. Examples of actions that may be stored include embedded link actions, table of contents actions, query actions, and navigation history actions.

For filtering criteria based on the distance between the user's current reading position and the navigated-to position in the eBook, the filtering criteria cause the history module 330 to pass (i.e., store) navigation actions that navigate to navigation positions a threshold distance away within the eBook from the user's current reading position. In one embodiment, this threshold distance is based on the amount of text on a page of the eBook displayed by the user device 130. Thus, history module 330 determines the distance between the current reading position and the navigated-to position, compares the distance to the threshold, and stores the navigation action if the distance exceeds the threshold.

The history module 330 may also store the current reading position prior to a navigation action as a separate entry in the navigation history. Storing the current reading position prior to navigation is useful in assisting the user in getting back to a position that may not otherwise be listed in the navigation history. For example, if the user rapidly scrolls through 10 pages to reach a particular page, then interacts with a link that navigates the user to another position, the user's reading position prior to these navigation actions may get lost. Storing the current reading position in the navigation list prior to these navigations provides a convenient way for the reader to return to the current reading position.

The history module 330 may rank the navigation positions in the navigation history. The ranking affects the order in which the entries in the navigation history are presented to the user by the interface. In one embodiment, the ranking is based on the relative importance and/or usefulness of the navigation positions. The ranking may be performed using one or more ranking criteria, examples of which include recency of access and frequency of access. When the history module 330 ranks by recency of access/navigation, more recently accessed navigation positions appear before less recently accessed navigation positions, or vice versa. When the history module 330 ranks by frequency of access, more frequently accessed navigation positions appear before less frequently accessed navigation positions, or vice versa. The ranking may also be combination ranking that takes into account both recency and frequency of access and/or other criteria. In one embodiment, the eBook module 135 includes user configurable preferences for determining the ranking used in presenting the navigation history.

The navigation history may be cumulative over multiple reading sessions, or reset and created separately for each reading session. A separate navigation history is stored for each eBook and each user in one embodiment. As the history module 330 logs the actions and their associated navigation positions responsive to their receipt at the interface, the resulting logging occurs automatically. No separate input is required to generate the navigation history. Thus, the navigation history avoids the problem of bookmarks which require separate affirmative action by the user prior to navigation away from a navigation position in order to be effective.

The communication module 340 is an externally facing module configured to communicate navigation histories with the eBook server 120. Thus, the communication module 340 may provide navigation histories generated on the user device 130 to the eBook server 120. The communication module 340 may also receive navigation histories generated on the user device 130 or other devices from the eBook server 120.

Overview of Methodology for the eBook Module and User Device

Figure 4:
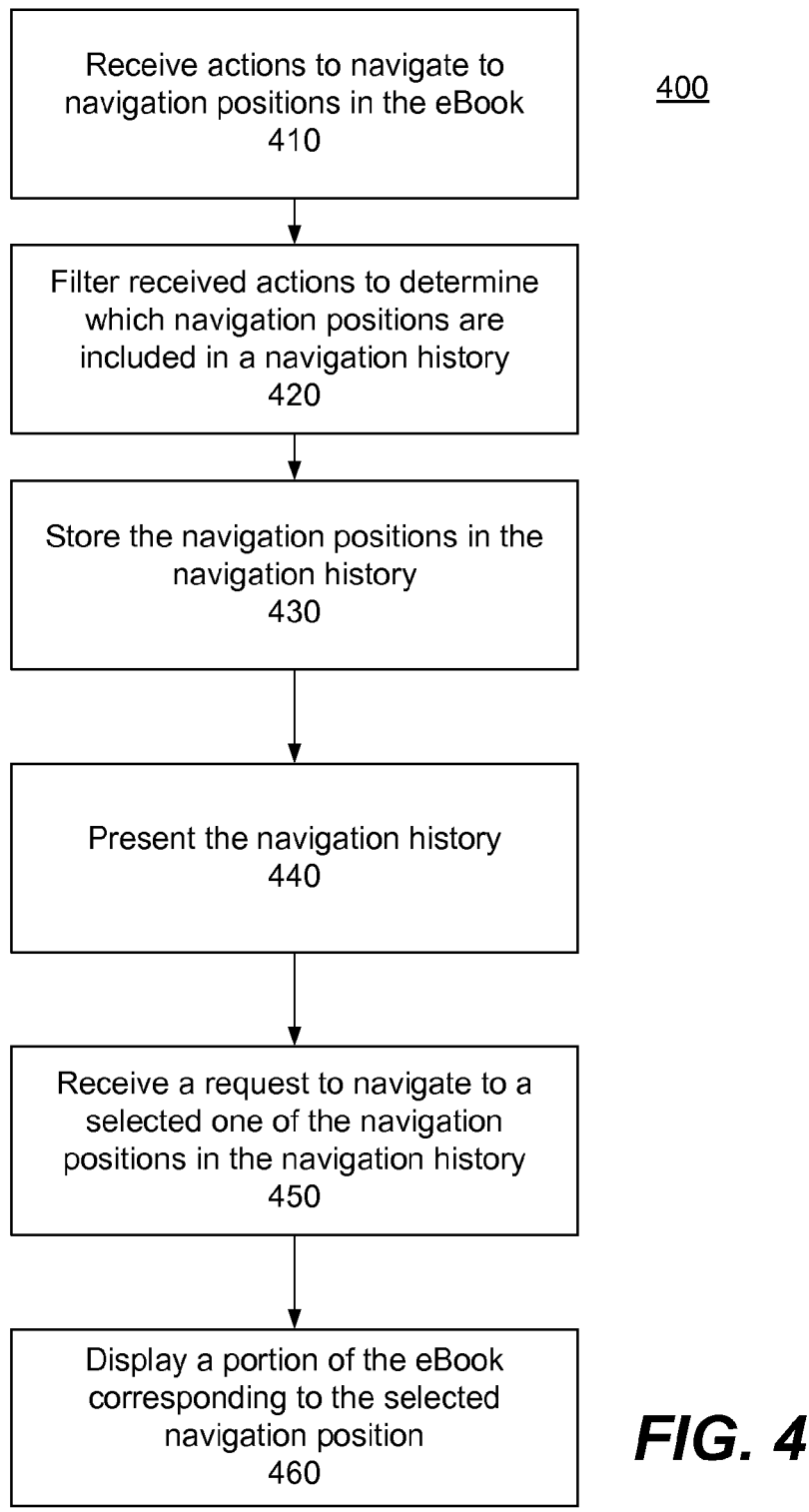
FIG. 4 is a flow diagram illustrating a process for providing a navigation history, according to one embodiment of the invention.

FIG. 4 is a flow diagram illustrating a process 400 for providing a navigation history, according to one embodiment of the invention. Other embodiments can perform the steps of the process 400 in different orders. Moreover, other embodiments can include different and/or additional steps than those described herein.

In step 410, the user device 130 receives actions through the interface to navigation to positions within the eBook. In step 420, the user device 130 filters the received actions to determine which navigation positions are stored in a navigation history. In step 430, the actions and corresponding navigation positions that pass the filtering are stored in a navigation history. The navigation positions in the navigation history are ranked using ranking criteria such as recency and frequency of access. In step 440, the user device 130 presents the navigation history to the user. In step 450, the user device 130 receives a request to navigate to a selected one of the navigation positions in the navigation history. In step 460, the user device 130 presents a portion of the eBook corresponding to the selected navigation position.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for providing dynamic pause for audio books. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A computer-implemented method of navigating an eBook on a user device, comprising:
   receiving a plurality of actions regarding navigation within the eBook, an action navigating from a current reading position within the eBook to a corresponding navigation position in the eBook, wherein the current reading position and the navigation position are associated with different portions of content of the eBook;
   filtering the received actions and the corresponding navigation positions to produce a filtered list of navigation positions, wherein the filtering comprises, for at least one of the received actions and corresponding navigation positions:
   determining a distance between the current reading position and a navigation position corresponding to one of the received actions in the eBook;
   comparing the distance between the current reading position and the navigation position to a threshold;
   wherein the threshold is determined responsive to an amount of text displayed on a page of the eBook by the user device;
   and storing the navigation position in the list of filtered navigation positions responsive to the comparison with the threshold;
   storing the filtered list of navigation positions in a navigation history;
   presenting the navigation history to a user of the user device;
   receiving a request from the user to navigate to a selected navigation position from the navigation history;
   and presenting a portion of the eBook at the selected navigation position to the user.

2. The method of claim 1, wherein receiving the plurality of actions comprises:
   logging navigation actions performed by the user of the user device using an interface presented by the user device.

3. The method of claim 1, wherein there are plurality of eBooks on the user device, and wherein storing the filtered list of navigation positions in the navigation history comprises:
   storing a plurality of separate navigation histories for the plurality of eBooks on the user device.

4. The method of claim 1, further comprising:
   sending the navigation history to an eBook server, wherein the eBook server is adapted to store the navigation history and provide the navigation history to a different user device used by the user.

5. The method of claim 1, wherein presenting the navigation history to a user of the user device comprises:
   ranking the list of navigation positions in the navigation in a ranked order according to at least one of: a recency of access and a frequency of access; and
   presenting the list of navigation positions in the navigation history to the user in the ranked order.

6. A computer system, comprising:
   a non-transitory computer-readable storage medium comprising executable computer program code for navigating an eBook on a user device, the computer program code:
   receiving a plurality of actions regarding navigation within the eBook, an action navigating from a current reading position within the eBook to a corresponding navigation position in the eBook, wherein the current reading positions and the navigation position are associated with different portions of content of the eBook;
   filtering the received actions and the corresponding navigation positions to produce a filtered list of navigation positions, wherein the filtering comprises, for at least one of the received actions and corresponding navigation positions:

determining a distance between the current reading position and the navigation position in the eBook;

comparing the distance between the current reading position and the navigation position to a threshold;

wherein the threshold is determined responsive to an amount of text displayed on a page of the eBook by the user device;

and storing the navigation position in the list of filtered navigation positions responsive to the comparison with the threshold;

storing the filtered list of navigation positions in a navigation history;

presenting the navigation history to a user of the user device; receiving a request from the user to navigate to a selected navigation position from the navigation history; and presenting a portion of the eBook at the selected navigation position to the user; and a computer processor for executing the computer program code.

7. The system of claim 6, wherein receiving the plurality of actions comprises:

logging navigation actions performed by the user of the user device using an interface presented by the user device.

8. The system of claim 6, wherein there are plurality of eBooks on the user device, and wherein storing the filtered list of navigation positions in the navigation history comprises:

storing a plurality of separate navigation histories for the plurality of eBooks on the user device.

9. The system of claim 6, the computer program code:

sending the navigation history to an eBook server, wherein the eBook server is adapted to store the navigation history and provide the navigation history to a different user device used by the user.

10. The system of claim 6, wherein presenting the navigation history to a user of the user device comprises:

ranking the list of navigation positions in the navigation in a ranked order according to at least one of: a recency of access and a frequency of access; and presenting the list of navigation positions in the navigation history to the user in the ranked order.

11. A non-transitory computer-readable storage medium storing executable computer program instructions, the computer program instructions comprising instructions for:

receiving a plurality of actions regarding navigation within the eBook, an action navigating from a current reading position within the eBook to a corresponding navigation position in the eBook, wherein the current reading position and the navigation position are associated with different portions of content of the eBook;

filtering the received actions and the corresponding navigation positions to produce a filtered list of navigation positions, wherein the filtering comprises, for at least one of the received actions and corresponding navigation positions:

determining a distance between the current reading position and the navigation position in the eBook;

comparing the distance between the current reading position and the navigation position to a threshold;

wherein the threshold is determined responsive to an amount of text displayed on a page of the eBook by the user device;

and storing the navigation position in the list of filtered navigation positions responsive to the comparison with the threshold;

storing the filtered list of navigation positions in a navigation history; presenting the navigation history to a user of the user device;

receiving a request from the user to navigate to a selected navigation position from the navigation history; and presenting a portion of the eBook at the selected navigation position to the user.

12. The storage medium of claim 11, wherein there are plurality of eBooks on the user device, and wherein storing the filtered list of navigation positions in the navigation history comprises:

storing a plurality of separate navigation histories for the plurality of eBooks on the user device.

13. The storage medium of claim 11, further comprising instructions for:

sending the navigation history to an eBook server, wherein the eBook server is adapted to store the navigation history and provide the navigation history to a different user device used by the user.

14. The storage medium of claim 11, wherein presenting the navigation history to a user of the user device comprises:

ranking the list of navigation positions in the navigation in a ranked order according to at least one of: a recency of access and a frequency of access; and presenting the list of navigation positions in the navigation history to the user in the ranked order.

* * * * *